United States Patent
Kumar et al.

(10) Patent No.: US 7,747,796 B1
(45) Date of Patent: Jun. 29, 2010

(54) CONTROL DATA TRANSFER RATES FOR A SERIAL ATA DEVICE BY THROTTLING VALUES TO CONTROL INSERTION OF ALIGN PRIMITIVES IN DATA STREAM OVER SERIAL ATA CONNECTION

(75) Inventors: Ambuj Kumar, Sunnyvale, CA (US); Mark A. Overby, Bothell, WA (US)

(73) Assignee: NVIDIA Corporation, Santa Clara, CA (US)

( * ) Notice: Subject to any disclaimer, the term of this patent is extended or adjusted under 35 U.S.C. 154(b) by 45 days.

(21) Appl. No.: 11/961,573

(22) Filed: Dec. 20, 2007

(51) Int. Cl.
*G06F 13/00* (2006.01)
*G06F 3/00* (2006.01)

(52) U.S. Cl. .............. 710/60; 710/25; 710/29; 710/33; 710/316; 713/400; 713/513; 702/106; 702/108

(58) Field of Classification Search ............ 710/25, 710/29, 33, 60, 316; 713/400, 513; 702/108, 702/106

See application file for complete search history.

(56) References Cited

U.S. PATENT DOCUMENTS

| | | | | |
|---|---|---|---|---|
| 7,272,527 B1 * | 9/2007 | Suto et al. | ............... | 702/108 |
| 7,356,555 B2 * | 4/2008 | Bedwani et al. | ............ | 709/200 |
| 7,360,010 B2 * | 4/2008 | Ghaffari et al. | ............ | 710/316 |
| 7,373,541 B1 * | 5/2008 | Stenfort et al. | ............ | 713/503 |
| 7,406,652 B2 * | 7/2008 | Tseng et al. | ............... | 714/798 |
| 7,496,700 B1 * | 2/2009 | Chong et al. | ............... | 710/52 |

* cited by examiner

*Primary Examiner*—Tammara Peyton
(74) *Attorney, Agent, or Firm*—Patterson & Sheridan, LLP

(57) ABSTRACT

Systems and methods for performing data transfer rate throttling o improve the effective data transfer rate for SATA storage devices. The data transfer rate is diluted by inserting ALIGN primitives when data is sent. The receiving device simply discards the ALIGN primitives. Therefore, the receive data FIFO does not fill as quickly and fewer flow control sequences are needed for flow control to prevent the receive data FIFO from overflowing. An advantage of using the ALIGN primitives instead of conventional flow control is that the round-trip handshake latency is not incurred to disable and later enable data transfers.

19 Claims, 4 Drawing Sheets

CONTROL DATA TRANSFER RATES FOR A SERIAL ATA DEVICE BY THROTTLING VALUES TO CONTROL INSERTION OF ALIGN PRIMITIVES IN DATA STREAM OVER SERIAL ATA CONNECTION

BACKGROUND OF THE INVENTION

1. Field of the Invention

One or more aspects of the invention generally relate to serial data transfers using the serial ATA (SATA) protocol, and more particularly to throttling data transfer rates to minimize the use of HOLD primitives for flow control.

2. Description of the Related Art

The SATA disk access protocol is used to transfer data between system memory and one or more disks. Most SATA storage devices have very limited data transfer throughput compared with the system memory bandwidth. For magnetic platter based drives, the sustained write throughput may be as low as 100 MB/sec. Consequently, these SATA storage devices may become performance bottlenecks when coupled to a fast host processor that can sustain a transfer rate of 300 MB/sec, as described by the SATA specification.

A flow control mechanism is specified by the SATA protocol in order to throttle the data transfer rate. In particular, the data transfers from the host processor to the SATA storage devices may be throttled so that the receive data first-in first-out (FIFO) does not overflow. When a high water mark in a data FIFO that stores the incoming data is reached, the SATA storage device outputs HOLD primitives. When the host processor receives the HOLD primitives, it outputs HOLDA primitives and stops sending data to the SATA storage device, acknowledging that the HOLD primitives have been received. The SATA storage device may resume accepting data after the HOLDA primitives are received and when space is available in the data FIFO to store incoming data, i.e., when a low water mark is reached. The SATA storage device communicates that it is accepting data by outputting R_IP primitives instead of HOLD primitives. When the host processor receives the R_IP primitives, it starts sending data instead of HOLDA primitives.

Over time, the effective transfer rate is the sustained data transfer rate of the SATA storage device, minus the flow control overhead of the R_IP to HOLD to HOLDA to R_IP sequence. The flow control introduces inefficiency since several cycles of latency (limited to a specified maximum) is incurred for each transfer between the SATA storage device and the host device due to the round-trip handshake across the SATA interface. Simply increasing the size of the data FIFO to store more incoming data may be used to delay the first occurrence of the flow control sequence, but does not improve the effective transfer rate once the data FIFO has filled for the first time.

Accordingly, it is desirable to improve the effective data transfer rate for SATA storage devices. It is also desirable to minimize the die area by not increasing the size of the data FIFO.

SUMMARY OF THE INVENTION

The current invention involves new systems and methods for improving the effective data transfer rate for SATA storage devices. The effective data transfer rate is decreased by inserting ALIGN primitives when data is sent. The receiving device simply discards the ALIGN primitives. Therefore, the receive data FIFO does not fill as quickly and fewer R_IP to HOLD to HOLDA to R_IP sequences are needed for flow control. An advantage of the ALIGN primitives is that the round-trip handshake latency is not incurred to disable and later enable data transfers.

Various embodiments of the invention include a system for performing data transfers using data transfer rate throttling over a Serial ATA connection. The system includes a sending device that is configured to transition into send data state when data is available for output to a receiving device over the Serial ATA connection. The sending device is configured to determine that an ALIGN primitive should be output instead of data to reduce the data transfer rate over the Serial ATA connection and output the ALIGN primitive to a receiving device. The receiving device is configured to store data received from the sending device and discard the ALIGN primitive.

Various embodiments of the invention include a method for performing data transfers for Serial ATA connections using data transfer rate throttling include entering a send data state when data is available for output over a Serial ATA connection between a sending device and a receiving device, determining that an ALIGN primitive should be output instead of data to reduce the data transfer rate over the Serial ATA connection, and outputting the ALIGN primitive from the sending device to the receiving device over the Serial ATA connection.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
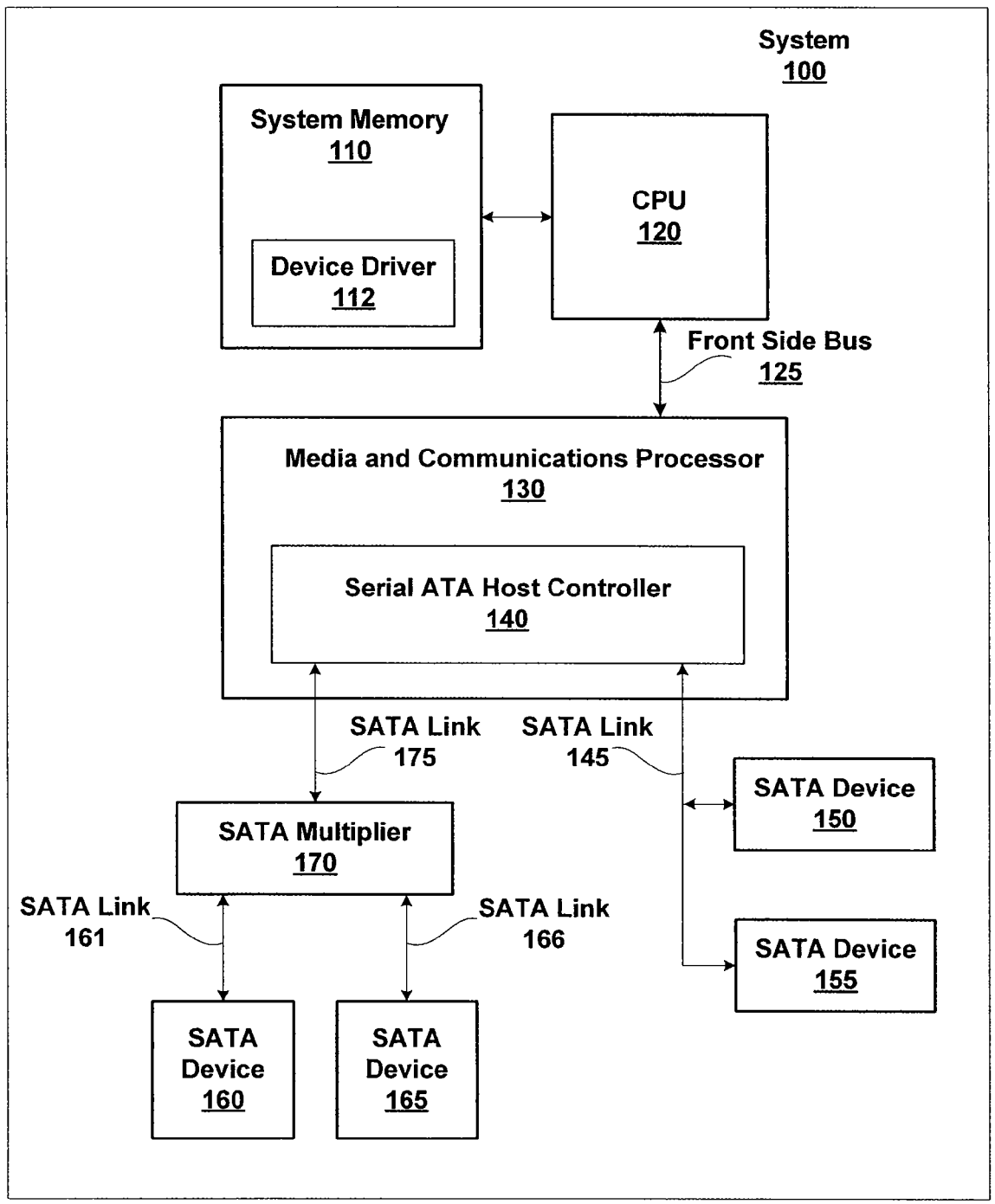
FIG. 1A is a block diagram of an exemplary embodiment of a respective computer system including a CPU and SATA devices in accordance with one or more aspects of the present invention.

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

The current invention involves new systems and methods for improving the effective data transfer rate for SATA storage devices. The effective data transfer rate is diminished by inserting ALIGN primitives when data is sent. The receiving device simply discards the ALIGN primitives. Therefore, the receive data FIFO does not fill as quickly and fewer R_IP to HOLD to HOLDA to R_IP sequences are needed for flow control. An advantage of the ALIGN primitives is that the round-trip handshake latency is not incurred to disable and later enable data transfers. In contrast, a conventional host controller does not generate an interrupt, but instead reissues the command without software intervention once the SATA bus is available.

FIG. 1 is a block diagram of an exemplary embodiment of a respective computer system, a system 100, in accordance with one or more aspects of the present invention including a CPU 120, media and communications processor 130, SATA multiplier 170, and SATA devices 150, 155, 160, and 165. In some embodiments of the present invention SATA devices 150, 155, 160, and 165 are mass storage devices such as hard disk drives. SATA devices 150, 155, 160, and 165 conform to the SATA standard and therefore, may be configured to use data transfer rate throttling in addition to conventional flow control signaling. System 100 includes a system memory 110 for storing programs and data used by CPU 120, including data that may be read from or written to hard SATA devices 150, 155, 160, and 165.

System 100 may be a desktop computer, server, laptop computer, palm-sized computer, tablet computer, game console, portable wireless terminal such as a personal digital assistant (PDA) or cellular telephone, computer based simulator, or the like. CPU 120 may include a system memory controller to interface directly to system memory 110. In alternate embodiments of the present invention, CPU 120 may communicate with system memory 110 through a system interface, e.g., I/O (input/output) interface or a bridge device.

A device driver 112 is stored in system memory 110. Device driver 112 is provided by the system designer and/or manufacturer of system 100 and is configured to interface between an operating system (not shown) running on CPU 120 and a media and communications processor 130. Media and communications processor 130 is coupled between CPU 120 and one or more hard disk drives, such as hard disk drives 150 and 155. Media and communications processor 130 is coupled to CPU 120 by a high bandwidth front side bus 125. In some embodiments of the present invention, media and communications processor 130 interfaces with CPU 120 over front side bus 125 using a peripheral component interface (PCI) HyperTransport™ Protocol.

Media and communications processor 130 facilitates data transfers between system memory 110 and one or more hard disk drives and includes a serial ATA host controller 140 that is coupled to SATA multipliers 170 via a SATA link 175 and one or more SATA devices 150, 155, 160, and 165 via a SATA link 145. SATA multiplier 170 and SATA devices 150, 155, 160, and 165 are configured to support data transfer rate throttling. SATA devices 150, 155, 160, and 165 each include drive electronics that control storing and reading of data within the individual disk, including buffering of data received from serial ATA host controller 140 and buffering of data for output to serial ATA host controller 140. Similarly, SATA multiplier 170 includes one or more data first-in first-out (FIFO) memories for storing data received from serial ATA host controller 140 for output to SATA device 160 or SATA device 165. SATA multiplier 170 also includes one or more data FIFOs for storing data output by SATA devices 160 and 165 to serial ATA host Controller 140.

In other embodiments of the present invention, media and communications processor 130 may include additional ports such as universal serial bus (USB), accelerated graphics port (AGP), and the like. Each SATA device 150, 155, 160, and 165 may be replaced or removed, so at any particular time, system 100 may include fewer or more SATA devices.

TABLE 1 shows the conventional flow control exchange and data transfer rate throttling in order to illustrate the improved efficiency of data transfer rate throttling. The sender, serial ATA host controller 140 or one of SATA devices 150, 155, 160, and 165, outputs Data N, N+1, N+2, and N+3 in the first 4 transfer cycles. When conventional flow control is used the receiver, one of SATA devices 150, 155, 160, and 165 or serial ATA host controller 140, outputs a HOLD primitive (indicating that the receive data FIFO has reached a high water mark) to signal to the sender that no more data should be sent. When data transfer rate throttling is used, the receiver does not need to send the HOLD primitive since the sender has output ALIGN primitives to reduce the data transfer rate. Therefore, the receive data FIFO has not reached the high water mark.

In this example, the HOLD primitive is received by the sender four transfer cycles after it is output by the receiver. The sender responds to the HOLD primitive by sending HOLDA (hold acknowledge) primitives instead of data to the receiver. The receiver continues to output HOLD primitives until the HOLDA is received (4 transfer cycles later) and then, since the receive data FIFO has drained to a low water mark level, the receiver outputs R_IP primitives to indicate that data can be received. The sender continues to output HOLDA primitives until the R_IP primitive is received (4 transfer cycles later) and then, the sender resumes outputting data to the receiver.

In contrast, when data transfer rate throttling is used the round-trip latency of 8 transfer cycles does not impact the data transfer rate. In many conventional systems the round-trip latency is greater than 8 transfer cycles, so the data transfer rate may be even further reduced when conventional flow control is used. Fortunately, the round-trip latency is limited to a maximum of 32 transfer cycles by the SATA specification. However, as shown in TABLE 1, the effective data transfer rate may be improved by using data transfer rate throttling to avoid overflowing the data receive FIFO instead of using conventional flow control. Specifically, during the 13 transfer cycles shown in TABLE 1, data is transferred for 5 cycles using conventional flow control compared with 9 cycles of data transfer using data transfer rate throttling.

TABLE 1

| Conventional flow control | | Data transfer rate throttling | |
|---|---|---|---|
| Sender output | Receiver output | Sender output | Receiver output |
| Data N | HOLD | ALIGN | |
| Data N + 1 | HOLD | ALIGN | |
| Data N + 2 | HOLD | ALIGN | |
| Data N + 3 | HOLD | ALIGN | |
| HOLDA | HOLD | Data N | |
| HOLDA | HOLD | Data N + 1 | |
| HOLDA | HOLD | Data N + 2 | |
| HOLDA | HOLD | Data N + 3 | |
| HOLDA | R_IP | Data N + 4 | |
| HOLDA | R_IP | Data N + 5 | |
| HOLDA | R_IP | Data N + 6 | |
| HOLDA | R_IP | Data N + 7 | |
| Data N + 4 | R_IP | Data N + 8 | |

The SATA specification requires sending two ALIGN primitives for every 256 data transfers for clock-recovery purposes. However, there is no limit preventing the output of additional ALIGN primitives. The ALIGN primitives are ignored by the link and transport layer state machines and are absorbed by the physical layer. Therefore, the ALIGN primitives may be used to reduce the data transfer rate and minimize the need to use the conventional flow control mechanism (R_IP to HOLD to HOLDA to R_IP sequence). When ALIGN primitives are inserted at a rate that causes the data transfer rate of the sending device to match the sustained data transfer rate of the receiving device, the conventional flow control is minimized and the highest possible effective data transfer rate is achieved.

Note that although CPU 120 typically has a higher data transfer rate compared with SATA devices 150, 155, 160, and 165, it is possible to use the data transfer throttle technique to dilute the data transfer rate when serial ATA host controller 140 is the sending device or when SATA devices 150, 155, 160, and 165 are the sending devices. Importantly, devices conforming to the SATA specification are able to function as a receiving device without any modification. Sending devices are configured to insert ALIGN primitives, as described in conjunction with FIGS. 1B and 2 in order to throttle the data transfer rate.

Figure 1B:
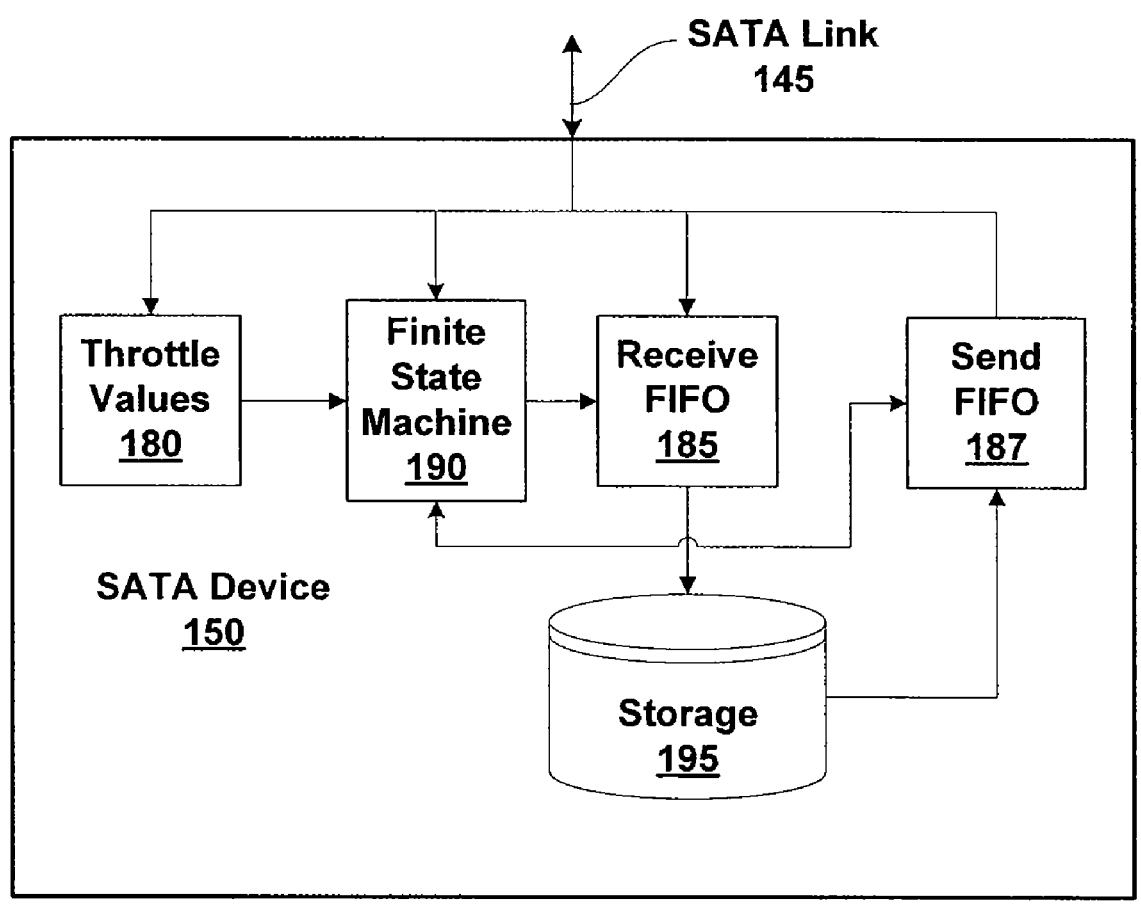
FIG. 1B is a block diagram of a SATA device of FIG. 1A in accordance with one or more aspects of the present invention.

FIG. 1B is a block diagram of SATA device 150 of FIG. 1A, in accordance with one or more aspects of the present invention. All or a portion of the elements described in the context of SATA device 150 may also be used to perform data transfer rate throttling within serial ATA host controller 140, SATA multiplier 170, SATA devices 155, 160, and 165. SATA device 150 includes a storage 195, finite state machine 190, receive (data) FIFO 185, send (data) FIFO 185, and throttle values 180. Finite state machine 190 implements the SATA protocol, including the Send Data State and Rcv (receive) Data state described in conjunction with FIGS. 2 and 3. Receive FIFO 185 stores data received via SATA link 145, buffering the data for storage in Storage 195. Send FIFO 187 stores data for output via SATA link 145, buffering the data read from Storage 195. In some devices, such as SATA multiplier 170 and serial ATA host controller 140, storage 195 is omitted since those devices perform routing functions for SATA communications.

Throttle values 180 are registers that store information used to insert ALIGN primitives in a data stream output by SATA device 150. The throttle values may include a number of ALIGN primitives to be inserted and a data count threshold value to compare with a data count maintained by finite state machine 190. The throttle values can be fixed or programmed by device driver 112. In order to maximize the effective data transfer rate to each SATA device in system 100, throttle values may be programmed for each receiving device.

Figure 2:
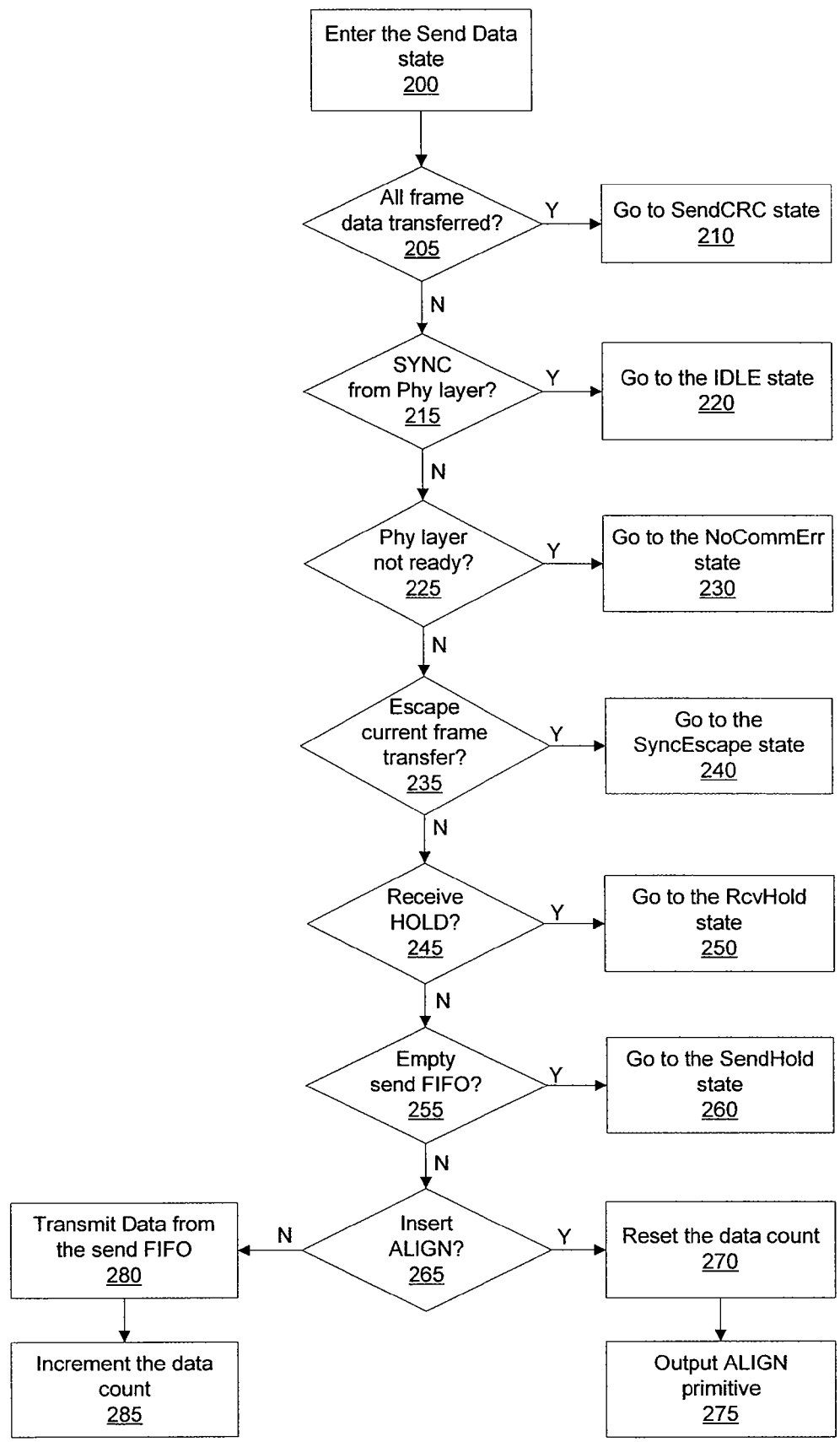
FIG. 2 is an exemplary embodiment of a method of performing data transfer rate throttling in the Send Data state in accordance with one or more aspects of the present invention.

FIG. 2 is an exemplary embodiment of a method of performing data transfer rate throttling in the Send Data state, in accordance with one or more aspects of the present invention. The method of FIG. 2 illustrates an embodiment of the protocol that may be performed by serial ATA host controller 140, SATA multiplier 170, and SATA devices 150, 155, 160, and 165. In step 200 the finite state machine 190 enters the send data state since data is available to be output via SATA link 145. In step 205, finite state machine 190 determines if all of the frame data has been transferred, and, if so, then in step 210 finite state machine 190 enters the SendCRC state. The SendCRC state is described in the SATA specification.

If, in step 205, finite state machine 190 determines that all of the frame data has not been transferred, then in step 215 finite state machine 190 determines if a SYNC is received from the physical (Phy) layer, and, if so, the in step 220 finite state machine 190 enters the IDLE state, as specified by the SATA specification. Otherwise, finite state machine 190 determines if the phy layer is not ready in state 225. If, in step 225 finite state machine 190 determines that the phy layer is not ready, then in step 230 finite state machine 190 enters the NoCommErr state 230, as specified by the SATA specification. Otherwise, in step 235 finite state machine 190 determines if an escape current frame transfer is received. If, an escape current frame transfer is received, then in step 240 finite state machine 190 enters the SyncEscape state, as specified by the SATA specification. Otherwise, in step 245 finite state machine 190 determines if a HOLD primitive is received, and, if so, then in step 250 finite state machine 190 enters the RcvHold state, as specified by the SATA specification.

If, in step 245 finite state machine 190 determines that a HOLD primitive is not received, then in step 255 finite state machine 190 determines if the send data FIFO is empty. If the send data FIFO is empty, then in step 260 finite state machine 190 enters the SendHold state, as specified by the SATA specification. Otherwise, in step 265 finite state machine 190 determines if an ALIGN primitive should be inserted to reduce the data transfer rate to the receiver.

Finite state machine 190 maintains a data count of the number of data transfer cycles that have occurred between ALIGN primitives. A data transfer cycle is a transfer cycle, e.g., clock cycle or fixed number of clock cycles, during which data is output to a receiver. In some embodiments of the present invention, a single ALIGN primitive is inserted between two data transfer cycles and in other embodiments of the present invention, multiple ALIGN primitives are inserted between two data transfer cycles. The number of ALIGN primitives that are inserted may be specified by throttle values 180. The number of data transfer cycles between ALIGN primitives is specified by throttle values 180.

If, in step 265 finite state machine 190 determines that an ALIGN primitive should not be inserted, then in step 280 finite state machine 190 transmits data that is output (popped) from send FIFO 187 to the receiver via SATA link 145. In step 285 finite state machine 190 increments the data count. If, in step 265 finite state machine 190 determines that an ALIGN primitive should be inserted, then in step 270 finite state machine 190 resets the data count. In step 275 finite state machine 190 outputs one or more ALIGN primitives based on throttle values 180. In some embodiments of the present invention, a new state, "insert ALIGN(s)" is included in the SATA link transmit state diagram. Finite state machine 190 enters the insert ALIGN(s) state to complete steps 270 and 275, and then returns to the send data state.

Figure 3:
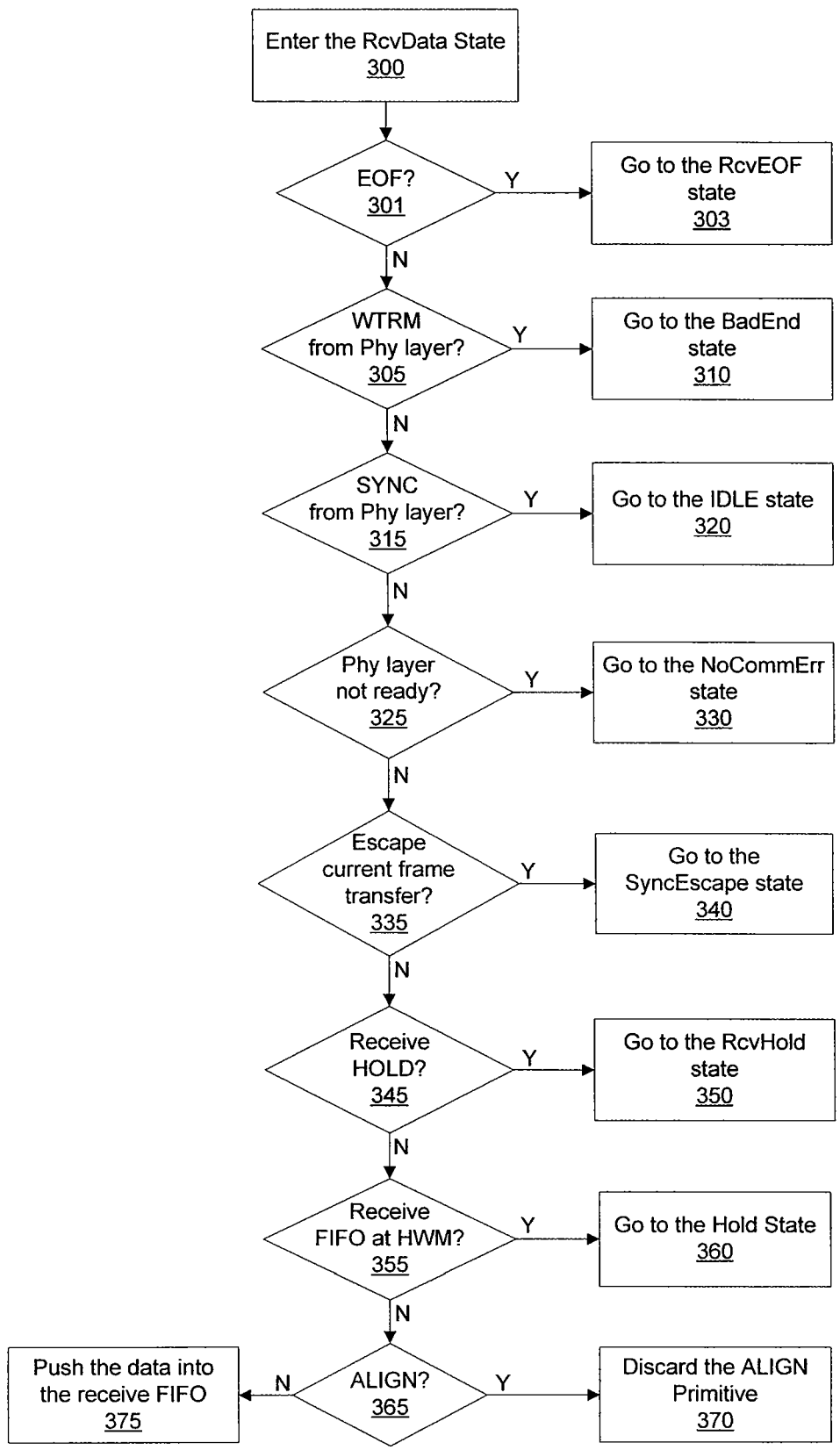
FIG. 3 is an exemplary embodiment of a method of performing data transfer rate throttling in the Rcv Data state in accordance with one or more aspects of the present invention.

FIG. 3 is an exemplary embodiment of a method of performing data transfer rate throttling in the Rcv (receive) Data state, in accordance with one or more aspects of the present invention. The method of FIG. 3 illustrates an embodiment of the protocol that may be performed by serial ATA host controller 140, SATA multiplier 170, and SATA devices 150, 155, 160, and 165. In step 300 finite state machine 190 enters the Rcv Data State since data or a primitive is received via SATA link 145. In step 305, finite state machine 190 determines if an EOF (end of frame) is received, and, if so, then in step 303 finite state machine 190 enters the RcvEOF state. The RcvEOF state is described in the SATA specification.

If, in step 301, finite state machine 190 determines that an EOF is not received, then in step 215 finite state machine 190 determines if a WTRM is received from the phy layer. If a WTRM is received, then in step 310 finite state machine 190 enters the BadEnd state, as specified by the SATA specification. Otherwise, in step 315 finite state machine 190 determines if a SYNC is received from the phy layer, and, if so, then in step 320 finite state machine 190 enters the IDLE state, as specified by the SATA specification. Otherwise, finite state machine 190 determines if the phy layer is not ready in state 325. If, in step 325 finite state machine 190 determines that the phy layer is not ready, then in step 330 finite state machine 190 enters the NoCommErr state, as specified by the SATA specification. Otherwise, in step 335 finite state machine 190 determines if an escape current frame transfer is received. If, an escape current frame transfer is received, then in step 340 finite state machine 190 enters the SyncEscape state, as specified by the SATA specification. Otherwise, in step 345 finite state machine 190 determines if a HOLD primitive is received, and, if so, then in step 350 finite state machine 190 enters the RcvHold state, as specified by the SATA specification.

If, in step 345 finite state machine 190 determines that a HOLD primitive is not received, then in step 355 finite state machine 190 determines if receive FIFO 185 has reached the high water mark (HWM). If receive FIFO 185 has reached the HWM, then in step 360 finite state machine 190 enters the Hold state, as specified by the SATA specification. Otherwise, in step 365 finite state machine 190 determines if an ALIGN primitive is received, and, if so, in step 370 finite state machine 190 discards the ALIGN primitive, i.e., does not push the ALIGN primitive into receive FIFO 185. If, in step 365 finite state machine 190 determines that an ALIGN primitive is not received, then data is received, and in step 375 finite state machine 190 stores the data (pushes) into receive FIFO 185.

Persons skilled in the art will appreciate that any system configured to perform the method steps of FIG. 2 or 3 or their equivalents, is within the scope of the present invention. The data transfer rate is diluted by inserting ALIGN primitives when data is sent from a sender with data transfer rate that is higher than that of the receiver. The receiving device simply discards the ALIGN primitives. Therefore, the receive data FIFO does not fill as quickly and fewer conventional high latency flow control sequences are needed to avoid overflowing the receive data FIFO. Reducing the number of conventional flow control sequences improves the effective data transfer rate while operating within the SATA specification.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A method of performing data transfers for serial ATA connections using data transfer rate throttling, comprising:
    entering a send data state when data is available for output over a Serial ATA connection between a sending device and a receiving device, wherein the sending device includes a throttle value register that stores throttle values used to control insertion of ALIGN primitives in a data stream output by the sending device, and a finite state machine that maintains a send data state and a receive data state;
    determining that an ALIGN primitive should be output instead of data to reduce the data transfer rate over the serial ATA connection based on the throttle values; and
    outputting the ALIGN primitive from the sending device to the receiving device over the serial ATA connection.

2. The method of claim 1, further comprising outputting additional ALIGN primitives to further reduce the data transfer rate over the serial ATA connection.

3. The method of claim 2, wherein a quantity of the additional ALIGN primitives is based on a data transfer rate of the receiving device when the data transfer rate of the receiving device is less than a data transfer rate of the sending device.

4. The method of claim 1, wherein the step of determining is based on a data transfer rate of the receiving device when the data transfer rate of the receiving device is less than a data transfer rate of the sending device.

5. The method of claim 1, further comprising resetting a data count when the ALIGN primitive is output, wherein the data count tracks a quantity of data transfer cycles that have occurred between ALIGN primitives.

6. The method of claim 5, further comprising:
    determining an ALIGN primitive should not be output from the sending device to the receiving device based on the throttle values;
    outputting the data to the receiving device; and
    incrementing the data count.

7. The method of claim 1, wherein the receiving device discards the ALIGN primitive.

8. The method of claim 1, wherein the sending device is a serial ATA host controller and the receiving device is a serial ATA storage device.

9. The method of claim 1, wherein the sending device is a serial ATA storage device and the receiving device is a serial ATA host controller.

10. A computer-readable medium containing a program which, when executed by a computing device, configures a Serial ATA device to perform a data transfer rate throttling, the process comprising:
    entering a send data state when data is available for output over a Serial ATA connection between a sending device and a receiving device, wherein the sending device includes a throttle value register that stores throttle values used to control insertion of ALIGN primitives in a data stream output by the sending device, and a finite state machine that maintains a send data state and a receive data state;
    determining that an ALIGN primitive should be output instead of data to reduce the data transfer rate over the serial ATA connection based on the throttle values; and
    outputting the ALIGN primitive from the sending device to the receiving device over the serial ATA connection.

11. A system for performing data transfers using data transfer rate throttling over a serial ATA connection, the system comprising:
    a sending device including:
        a throttle value register that stores throttle values used to control insertion of ALIGN primitives in a data stream output by the sending device and
        a finite state machine that maintains a send data state and a receive data state,
    wherein the sending device is configured to:
        enter the send data state when data is available for output over the serial ATA connection,
        determine that an ALIGN primitive should be output instead of data to reduce the data transfer rate over the serial ATA connection based on the throttle values, and
        output the ALIGN primitive to a receiving device; and
    the receiving device configured to store data received from the sending device and discard the ALIGN primitive.

12. The system of claim 11, wherein the throttle values specify a quantity of ALIGN primitives that are output in consecutive data transfer cycles.

13. The system of claim 11, wherein the throttle values specify a maximum number of consecutive data transfer cycles for which data can be output without outputting an ALIGN primitive to throttle the data transfer rate over the serial ATA connection.

14. The system of claim 11, wherein the sending device is further configured to maintain a data count that indicates a number of data transfer cycles that have occurred following a most recently output ALIGN primitive.

15. The system of claim 14, wherein the sending device is further configured to reset the data count when an ALIGN primitive is output and increment the data count for each data transfer cycle that data is output.

16. The system of claim 11, wherein the sending device is a serial ATA host controller and the receiving device is a serial ATA storage device with a data transfer rate that is less than a data transfer rate of the serial ATA host controller.

17. The system of claim 11, wherein the sending device is a serial ATA storage device and the receiving device is a serial ATA host controller with a data transfer rate that is less than a data transfer rate of the serial ATA storage device.

18. The system of claim 11, wherein the sending device is a serial ATA multiplier and the receiving device is a serial ATA storage device.

19. The system of claim 11, wherein the sending device is a serial ATA host controller and the receiving device is a serial ATA multiplier.

* * * * *